United States Patent
Naylor et al.

(10) Patent No.: US 6,876,960 B1
(45) Date of Patent: Apr. 5, 2005

(54) METHOD AND APPARATUS FOR REMOTELY ASSEMBLING A PHYSICAL SYSTEM

(75) Inventors: David L. Naylor, Chicago, IL (US); Stephan C. Werges, Lombard, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 0 days.

(21) Appl. No.: 09/401,352

(22) Filed: Sep. 27, 1999

(51) Int. Cl.[7] .............................................. G60F 17/50
(52) U.S. Cl. .............................. 703/14; 703/13; 703/15; 700/96; 700/182
(58) Field of Search .............................. 703/13, 14, 15, 703/7; 700/96, 182; 707/10; 392/485

(56) References Cited

U.S. PATENT DOCUMENTS

| | | | |
|---|---|---|---|
| 3,795,789 A | * 3/1974 | Malzoni et al. | 392/485 |
| 5,107,146 A | * 4/1992 | El-Ayat | 326/41 |
| 5,511,108 A | * 4/1996 | Severt et al. | 379/1.01 |
| 5,572,430 A | * 11/1996 | Akasaka et al. | 700/95 |
| 5,812,130 A | * 9/1998 | Van Huben et al. | 345/764 |
| 5,821,934 A | * 10/1998 | Kodosky et al. | 345/763 |
| 5,822,206 A | * 10/1998 | Sebastian et al. | 700/182 |
| 5,864,875 A | * 1/1999 | Van Huben et al. | 707/10 |
| 5,950,201 A | * 9/1999 | Van Huben et al. | 700/96 |
| 6,034,541 A | * 3/2000 | Kopec et al. | 326/39 |
| 6,038,399 A | * 3/2000 | Fisher et al. | 713/1 |
| 6,121,965 A | * 9/2000 | Kenney et al. | 345/810 |
| 6,202,070 B1 | * 3/2001 | Nguyen et al. | 707/10 |
| 6,230,066 B1 | * 5/2001 | Sferro et al. | 345/419 |
| 6,247,128 B1 | * 6/2001 | Fisher et al. | 713/1 |
| 6,381,556 B1 | * 4/2002 | Kazemi et al. | 345/594 |

OTHER PUBLICATIONS

"Using IsSpice4", Intsoft, Inc., pp. 19–85, May 1998.*

* cited by examiner

Primary Examiner—Kevin J. Teska
Assistant Examiner—Fred Ferris
(74) Attorney, Agent, or Firm—Welsh & Katz, Ltd.

(57) ABSTRACT

A method and apparatus are provided for assembling and operating a physical system having a plurality of structural elements and structural interconnections from a remote location. The method includes the step of creating a graphical representation of the physical system at the remote location showing the elements and connections of the system to be assembled. The method further includes the steps of converting the graphical representation into an element list delineating the elements and the interconnections, transferring the element list from the remote location to an element controller and assembling and operating the system by the element controller in accordance with the element list.

32 Claims, 8 Drawing Sheets

METHOD AND APPARATUS FOR REMOTELY ASSEMBLING A PHYSICAL SYSTEM

FIELD OF THE INVENTION

The field of the invention relates to physical systems and more particularly to the modeling and testing of physical systems.

BACKGROUND OF THE INVENTION

In the creation of physical systems, a designer typically creates a rendition of the physical system on drawing paper. Often many drawings are required to describe the physical system.

Once the system is designed, construction of the system may begin. Where the system is small, a model maker may make and test the system to understand its operation under a number of test conditions. Where system operation differs from that expected, it is often necessary to redesign the system, build another model, and re-test that system.

Software programs are sometimes available wherein a programmer may enter simulation values and which allows certain aspects of the system to be simulated. While these programs are useful in modeling small portions of some systems they typically cannot accommodate the vagaries of larger, more complex systems.

While physical models of systems are tedious and time consuming to build, they tend to provide the best information regarding the performance and the unknowns associated with system design. Accordingly, a need exists for a means of quickly and easily assembling physical systems automatically.

SUMMARY

A method and apparatus are provided for assembling and operating a physical system having a plurality of structural elements and structural interconnections from a remote location. The method includes the step of creating a graphical representation of the physical system at the remote location showing the elements and connections of the system to be assembled. The method further includes the steps of converting the graphical representation into an element list delineating the elements and the interconnections, transferring the element list from the remote location to an element controller and assembling and operating the system by the element controller in accordance with the element list.

Figure 1:
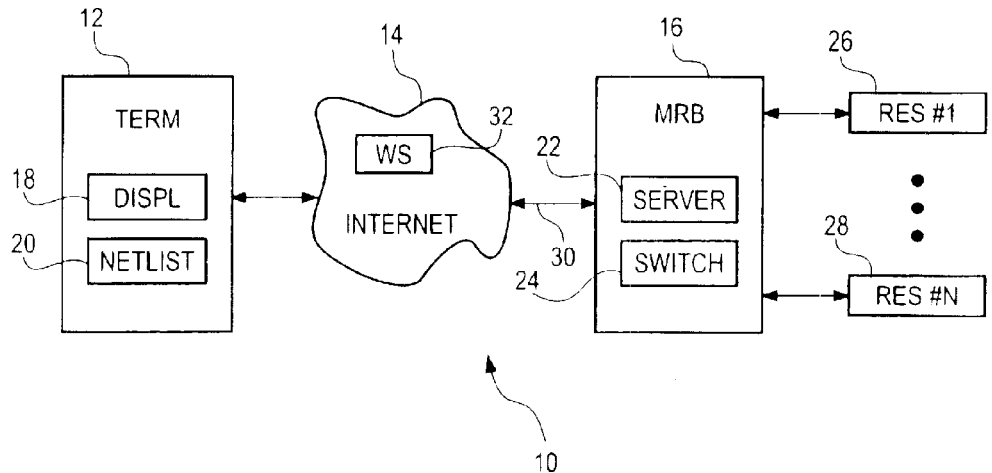
FIG. 1 is a block diagram of the modeling system in accordance with an illustrated embodiment of the invention.

Appendix I provides information regarding the classes and methods of the server program of the system of FIG. 1.

Appendix II is source code for the main routine of the system of FIG. 1.

DETAILED DESCRIPTION OF A PREFERRED EMBODIMENT

FIG. 1 depicts a block diagram of a remotely operated modeling system 10, generally in accordance with an illustrated embodiment of the invention. Under the illustrated embodiment, a user working through a terminal 12 may create a graphical representation of the physical system to be modeled or investigated. The graphical representation may include any number of physical devices interconnected to form a functional system. One or more forcing functions may be added to the modeled system to determine a response under load. A set of measurement points for evaluating system performance may be identified and added to test the modeled system. Within the terminal 12, the graphical representation of the system is converted by a conversion processor into an element list 20 and transferred by a communication processor through the Internet 14 to an element processor (i.e., a measurement resource broker (MRB) 16).

Within the MRB 16 the element list is checked for errors. The MRB 16 determines whether it has the physical elements and particular forcing function(s) needed to construct and operate the physical model. If it does, the MRB 16 assembles the physical system. Test instruments are connected to the physical model, as is the forcing function. Measurements are collected on system performance and the measurements returned to the terminal 12.

Under a first illustrated embodiment, a process will be described by which the remotely operated modeling system 10 may be used to construct and physically test electrical circuits. However, it should be understood that the described process is applicable to the assembly and/or control of any physical system, whether electrical, mechanical, or otherwise.

As a first step in understanding the system 10, a description will be provided of the control functions used by the system 10. Following a description of the control functions, a specific example will be provided of the use of the system 10.

The modeling system 10 includes a number of software and hardware components. Under the illustrated embodiment, a client program (e.g., a "client architecture" operating within the terminal 12) communicates with a server program (in the MRB 16), which in turn communicates with MRB resources 26, 28 that are used to perform a task. Data that is created during performance of the task is then returned to the client program in the terminal 12.

The client architecture operating within the terminal 12 consists of a graphical user interface, which the user employs to construct a graphical representation of a task to be performed. As the graphical representation is constructed, the program automatically builds the element list. When the user requests that the configured task be performed (i.e., executed), the element list is sent over a communication network (e.g. the Internet) to the server program (MRB).

After the elements list 20 is sent to the server 22, the server 22 assembles the elements of the list 20 and tests the modeled system (i.e., the "Device Under Test" or "DUT") as directed. The term "Device Under Test" or DUT is used herein to refer either to a single device or a collection of devices and physical elements connected as a physical system. Test results of the modeled system are collected by the server 22 and sent back to the terminal 12 as test data. The client program within the terminal 12 listens for incoming data from the server 22 and allows the data from the server 22 to be displayed in a variety of different ways.

Figure 7:
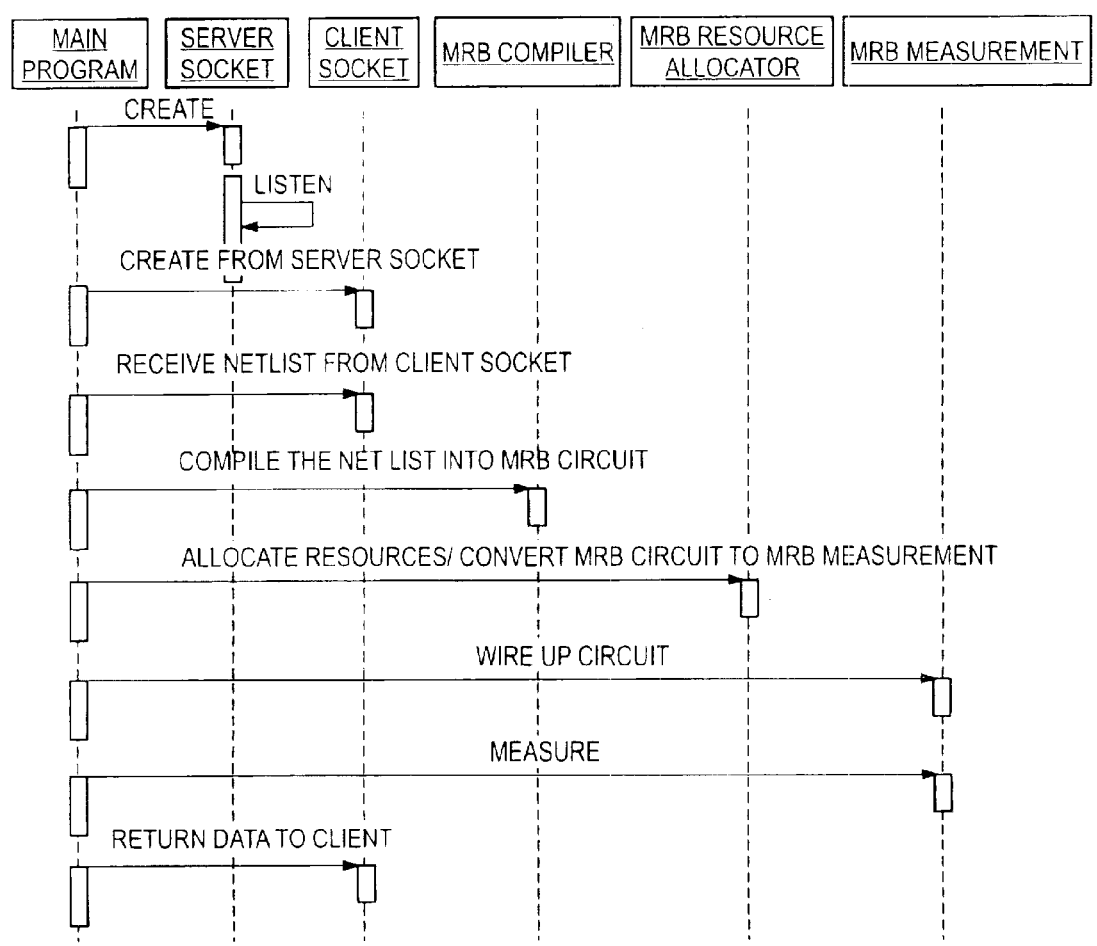
FIG. 7 depicts a transaction flow diagram of the system of FIG. 1.

As shown in FIG. 7, when the Server program (Measurement Request Broker) first starts (i.e., begins running), it establishes a ServerSocket to listen for incoming Measurement Requests. A ClientSocket is established for communication with each separate Client that requests service.

Figure 2:
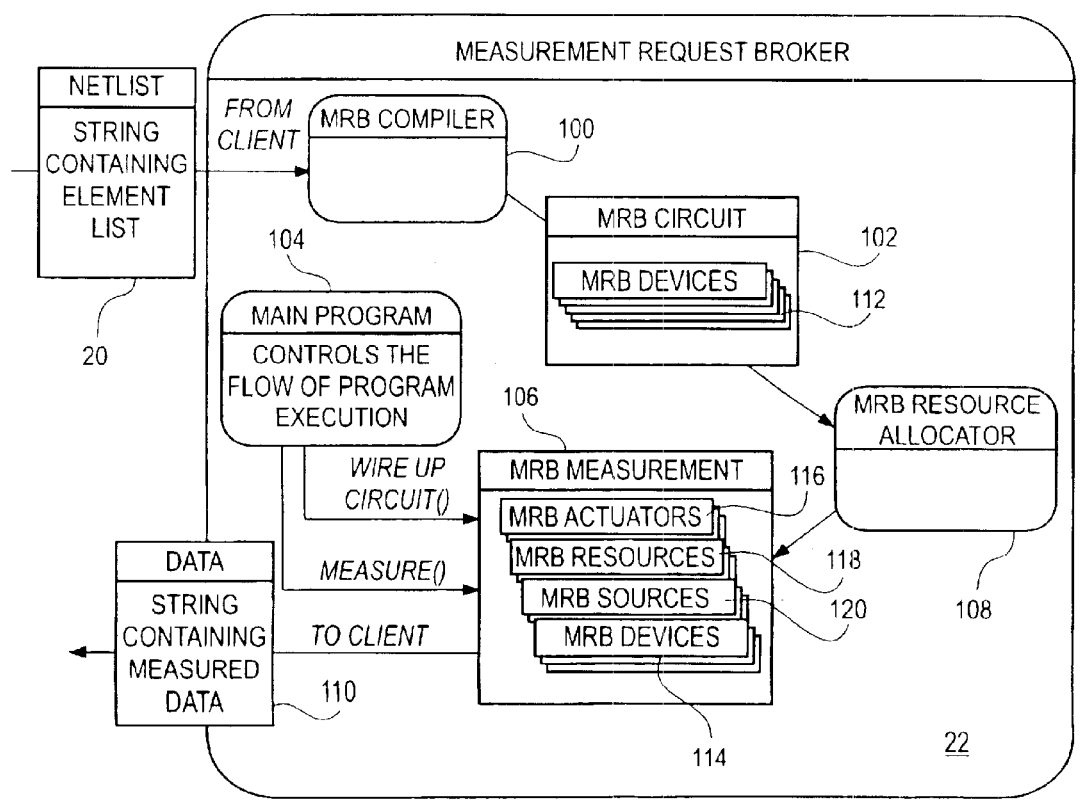
FIG. 2 is a block diagram of a server of FIG. 1.

In FIG. 2, objects shown as rounded rectangles have a single instance (i.e., exist as a single copy), which is permanent. Objects shown as rectangles are transient and exist only during a single Measurement Request transaction.

The Client program sends to the Server program a text file (i.e., a Netlist shown in FIG. 2) containing the element list 20. In the current embodiment the format of the text file uses the SPICE syntax. In another embodiment the element list may be constructed in the server as a result of separate messages sent from the client detailing modifications of the requested task. The MRBCompiler object 100 converts the Netlist into an MRBCircuit 102, which is forwarded to the MRBResourceAllocator 108. The MRBCircuit 102 contains a list of MRBDevices 112 corresponding to user-requested or user-desired devices.

The MRBResourceAllocator 108 converts this list of requested devices to an MRBMeasurement 106, which contains another list of MRBDevices 114, this time corresponding to devices that are actually available.

The MRBMeasurement 106 also includes a list of MRBActuators 116, a list of MRBResources 118 and a list of MRBSources 120. An MRBResource 118 encapsulates (i.e., provides the capabilities of) an actual device, in the form of an MRBDevice 114, but it can also provide information regarding the measurement capabilities supported by the device. Measurement capabilities include such things as "voltage sweep" or "measure current". The MRBActuators 116 allow a uniform access to devices 114 since they all support the same set of five basic operations: Clear, Setup, Wait (for external trigger), Commit (all changes), and Trigger. A device is wrapped in an MRBActuator (i.e., its operation is specified by the programming of the MRBActuator), which controls looping and operational flow of the device. The MRBMeasurement 106 knows how to use the MRBActuators (via programming limits resident within the MRBMeasurement), which in turn know how to control individual MRBDevices (also via a set of operational instructions/limitations). The separate list of MRBDevices in the MRBMeasurement correspond to passive devices within the list of MRBResources.

After the MRBMeasurement 106 has been created, the "connect( )" method is called on this object, which causes the matrix switch 24 to be configured so that the desired connections are made. The Main program then calls the measure( ) method of the MRBMeasurement, which triggers the dominant MRBActuator. A text string (Data) is returned which contains the measured data. This Data string is returned to the Client program.

The client (i.e., terminal 12) may be built with Java and provides facilities to manipulate the data from the measurement.

The steps of assembling and testing the DUT may be accomplished as shown schematically in FIGS. 2 and 7. The incoming data is received by the server 22 and a task object is spawned. The task object is used to encapsulate details of a physical task that will be performed under the direction of the task object. The task object is composed of user requested elements and is passed to a resource allocating object. Here the task (and its elements) are checked to make sure that all the parameters are acceptable, and the locations of the test equipment and elements of the DUT in the matrix switch are located. If all parameters are within acceptable ranges (i.e., within both instrument and element limitations) and the resources 26, 28 are available a modified task object is constructed. The matrix object is called to assemble the DUT, electrically connect any forcing function and the test equipment to the DUT and the modified task object is instructed to perform the measurement. The results of the measurement or error messages are returned to the server after the measurement has been performed. At this point, the data is serialized and the results sent back to the client within the terminal 12. Once the data has been received by the terminal 12, the user may manipulate it with the tools provided by the send client.

Under one illustrated embodiment of the modeling system 10, a user may connect to a web site 32 using a web browser installed within the terminal 12. One of the web pages to which the user may connect may contain a Java applet that may be downloaded to the browser and run within the browser on the user's terminal 12. In another embodiment (discussed above), the client runs as a Java application, which does not require a web browser. The Java applet or application contains a user interface, which allows the user to graphically create a representation of a task to be performed. While many different applications may be used to create the representation (i.e., of the DUT), the circuit modeling language SPICE has been found to work well.

Figure 3:
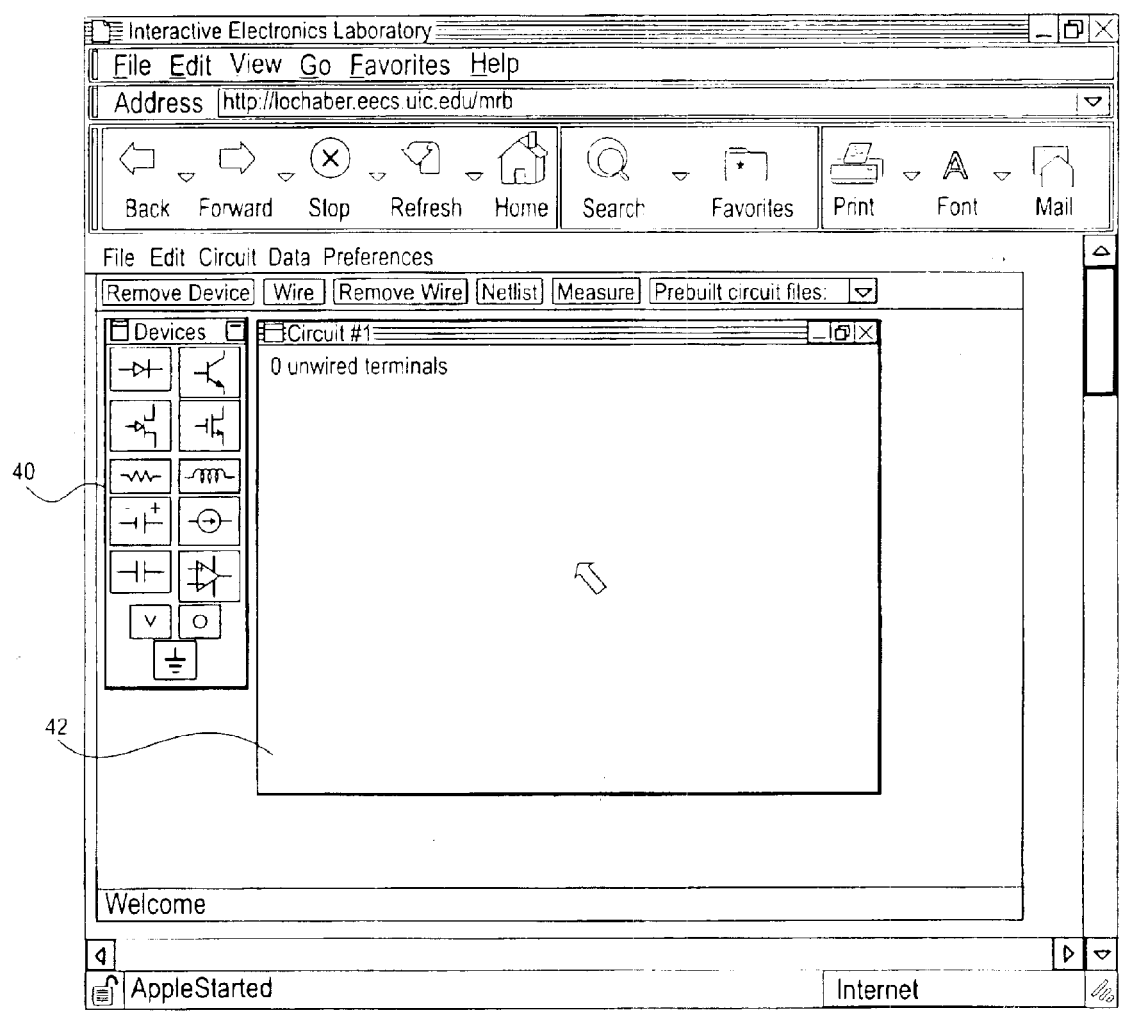
FIG. 3 is a screen of a terminal of FIG. 1.
Figure 4:
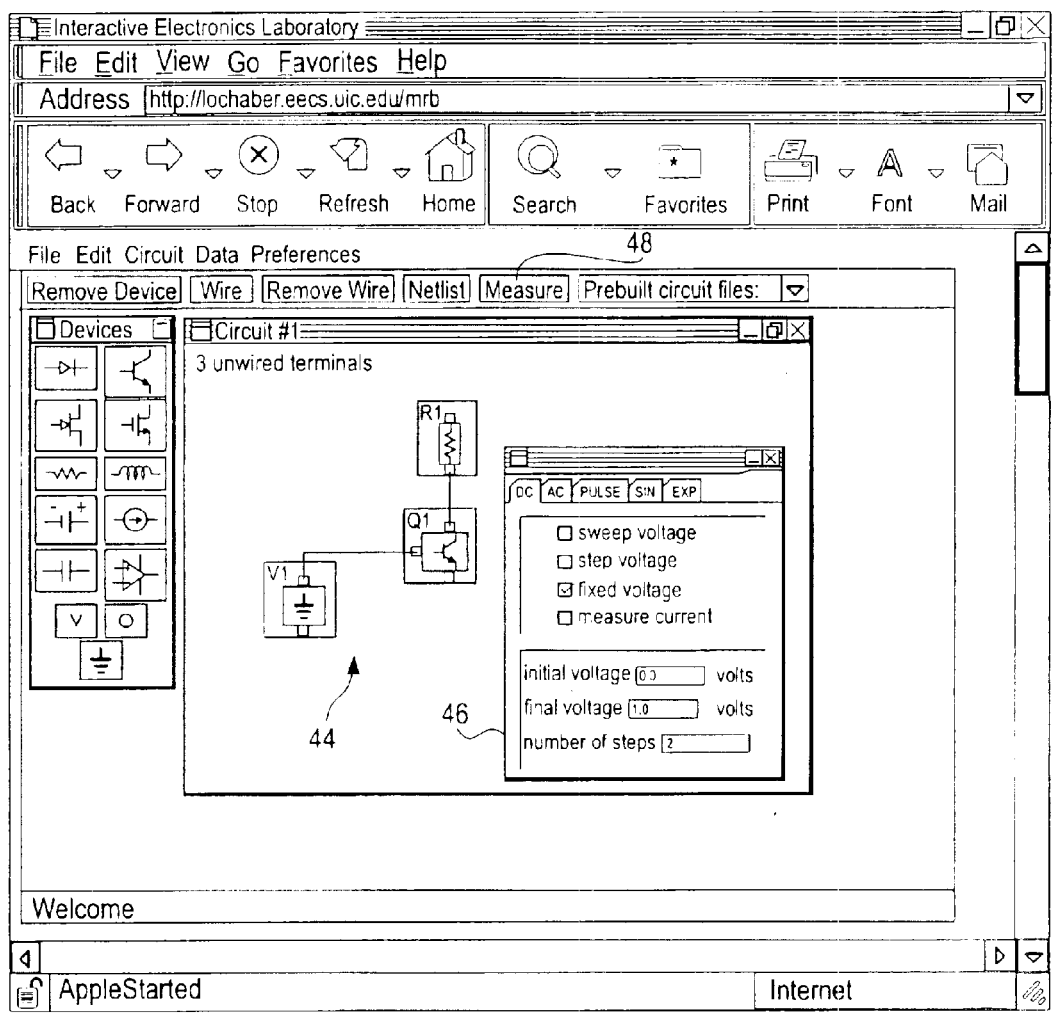
FIG. 4 is a partially completed screen of the terminal of FIG. 1.

For example, the user may successively select (FIG. 3), elements from a palette (e.g., within a reference area 40), containing a collection of graphical symbols that represent building blocks of a task. In the case of an electronic circuit experiment, the different icons may represent electronic components (e.g., resistors, capacitors, inductors, transistors, etc.) and function blocks such as voltage sources (forcing functions) and measuring probes. The user may drag icons to an assembly area 42, one at a time (FIG. 4). The user interconnects these on the screen to represent the task to be performed (i.e., the modeled system, or DUT, to be constructed and tested). One or more parameters of the elements of the DUT can be provided by the user through the terminal 12.

Figure 5:
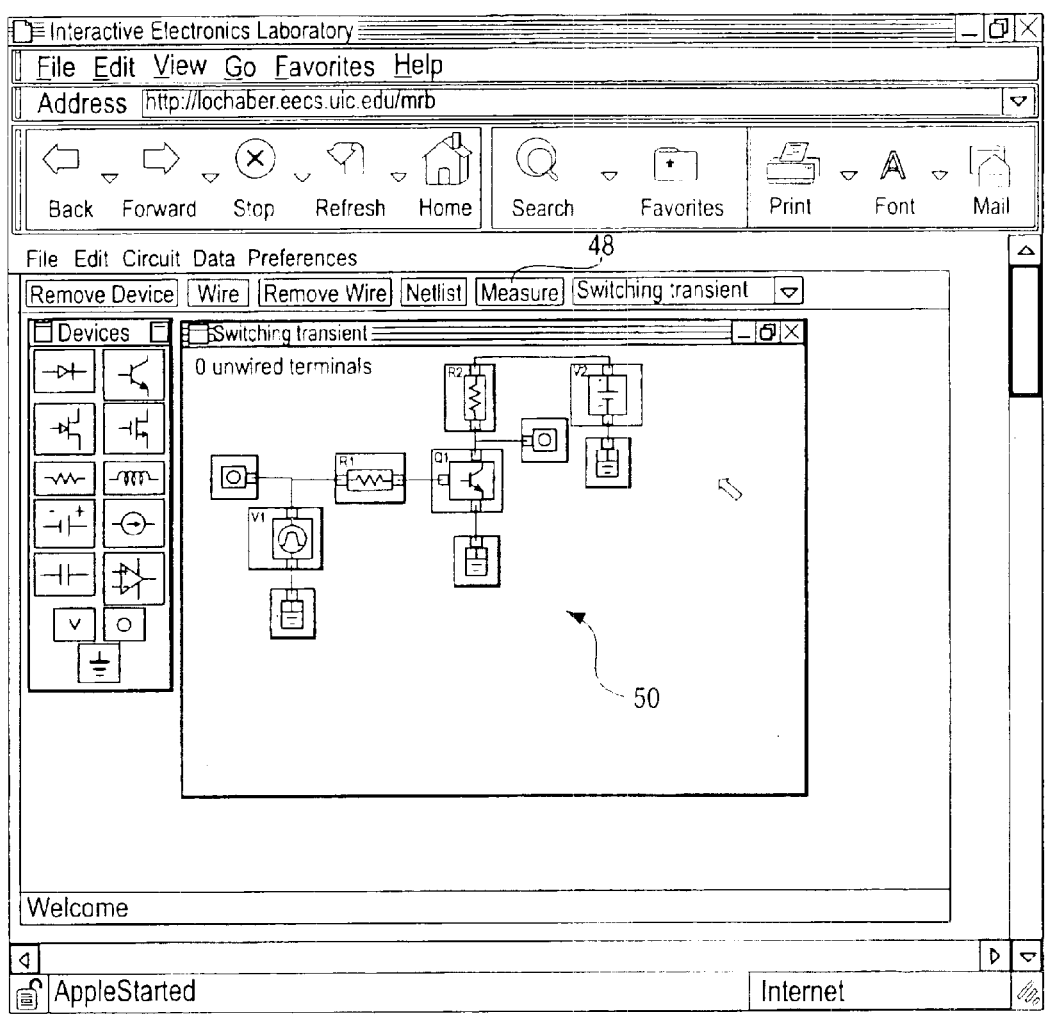
FIG. 5 is a screen showing a circuit on a terminal of FIG. 1.
Figure 6:
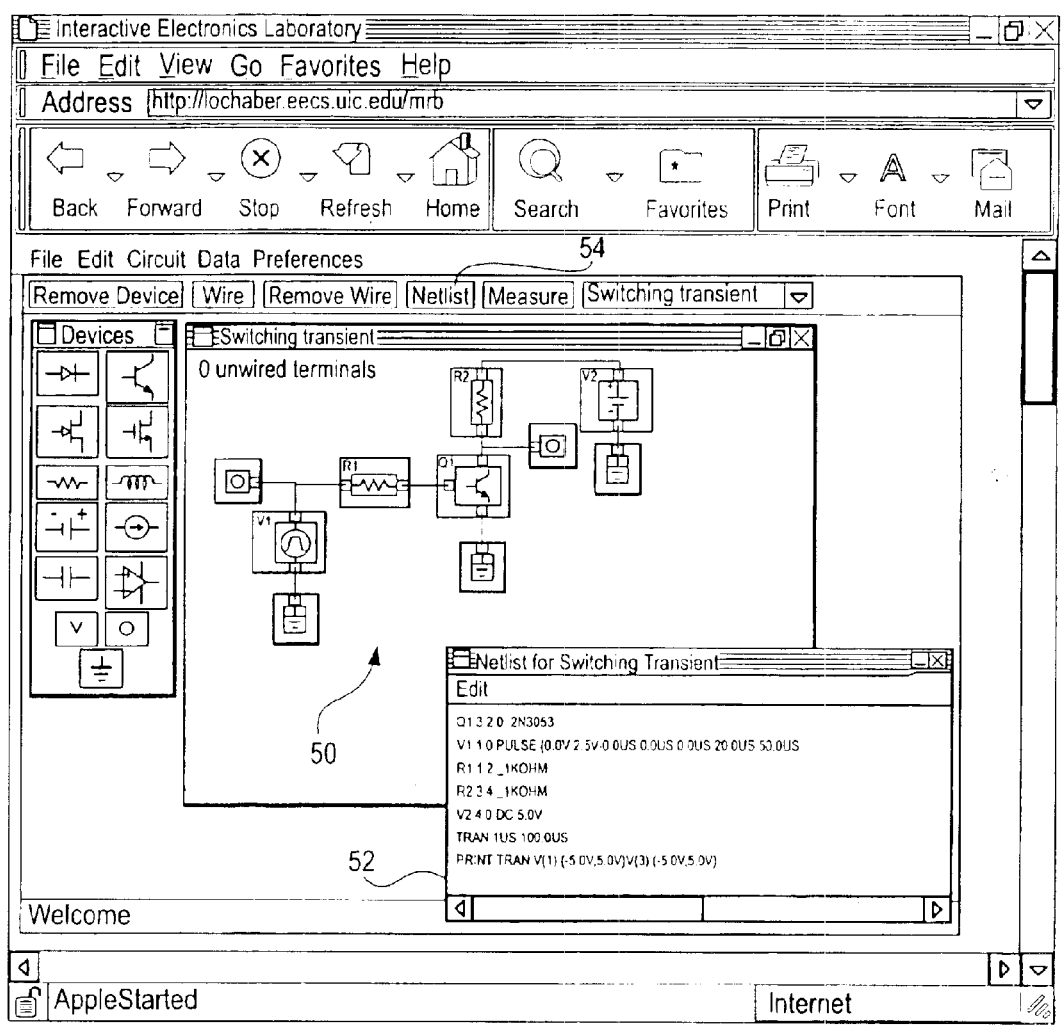
FIG. 6 is a screen showing a circuit and netlist of the system of FIG. 1.

Parameters are provided for a particular element by selecting the element with a mouse cursor and changing the default values of device parameters that appear in a dialog window 46 which appears. When the DUT (circuit 44) (or other task) has been configured, it may be saved to a file for later use. Similarly, a previously created file may be loaded from storage, or may be downloaded over the network allowing a person to quickly use a previously configured arrangement of components 50 (FIG. 5) as the DUT. The task is initiated by selecting the "measure" button 48 on the user's interface. Under the illustrated embodiment, a text-based description (i.e., an element list) of the task is sent over the network to the server 22. Further, the element list 52 (FIG. 6) may be examined at any time by activating a "netlist" button 54.

Once received, the server 22 parses the text-based description of the element list to check for syntactical correctness and then if the text can be parsed correctly, the server checks for the availability of required resources 26, 28 (i.e., resistors, capacitors, inductors, transistors, etc.). The client 18 may perform some of the checking for resource availability. The syntax used for the text-based description of the task may be that of the circuit simulation language SPICE. This has the added benefit that the task may be simulated within the terminal 12, or in some networked server, in advance of physical assembly and testing within the MRB 16.

Figure 9:
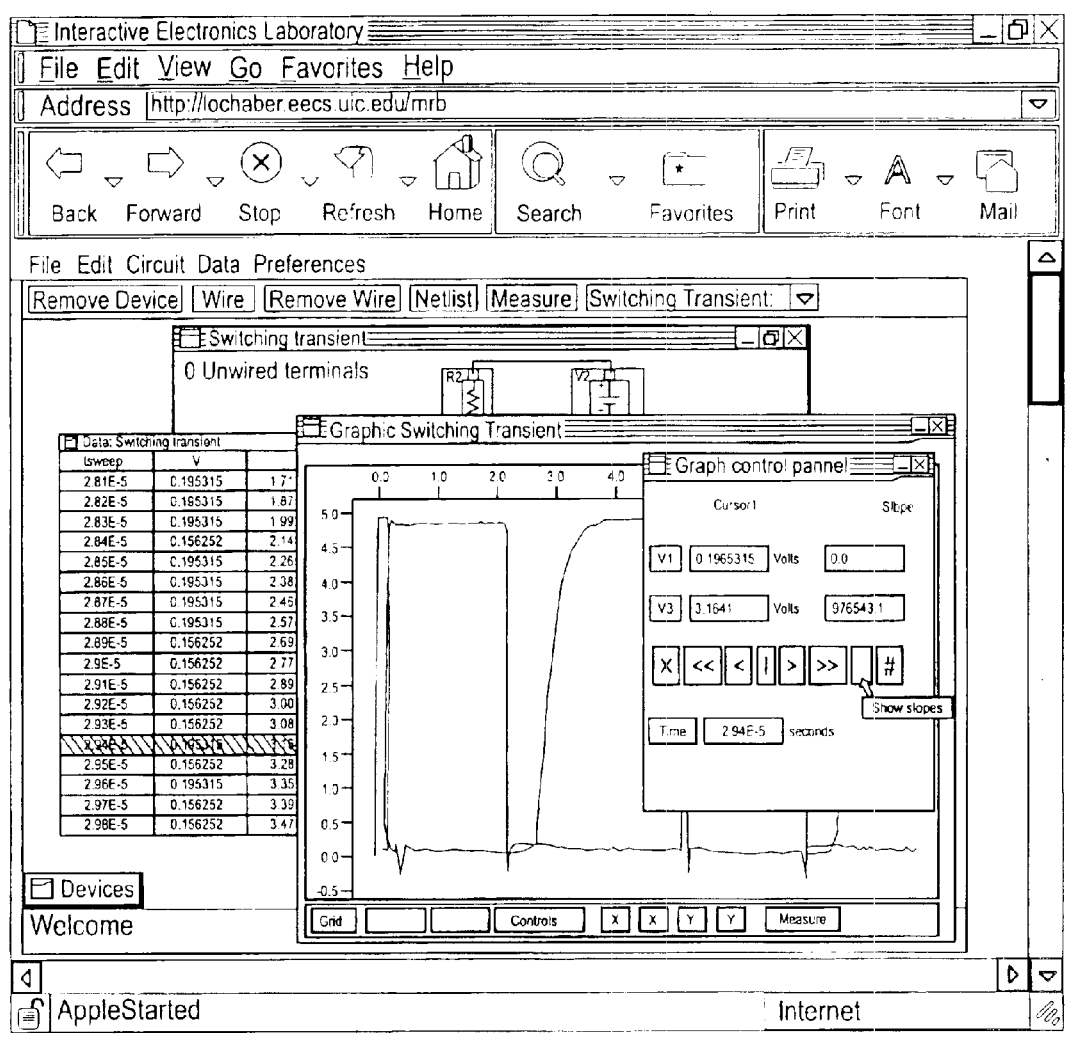
FIG. 9 depicts test results of the modeling system of FIG. 1.

Assuming that the resources are available, the server 22 locates the specific resources 26, 28 to perform the requested task; configures the required interconnections; configures the instruments; and triggers the instruments to collect data. After the measurements are completed, the data is read in from the instruments to the server. The server 22 repackages the data into a format suitable for the client and sends a data string back to the client programs. The client program parses the data string and internally stores that data in a format that can be presented to the user in both tabular and graphical form (FIG. 9).

In another embodiment of the system 10, distributed software object technology may be used to avoid the creation and parsing of the text-based task description. An object stub in the client allows the direct creation of the type of task object that the server creates following the parsing step. (By distributed software object technology we means environments that follow the CORBA standard (ref: Object Management Group) or which use Microsoft's Distributed Component Object Model (DCOM).)

Turning now to the server 22, a description will be provided of the various threads followed in evaluating a DUT. The main server program thread first creates a listening socket and waits for incoming connections. When a connection is received the main thread creates a new socket representing this connection. The new socket is converted into a RWSocketPortal and various information items may be received from the client including the SPICE netlist. The main thread passes the netlist to the MRBCompiler where it is checked for syntactical and semantic correctness. The result of the compilation is a list of MRBCircuits. This list of MRBCircuits provides one embodiment of the task object mentioned earlier.

The list of MRBCircuits is passed to the MRBResourceAllocator by the main thread. In the MRBResource the MRBCircuits are checked to see if there are resources 26, 28 available to create the given circuit(s) (i.e., the DUT). The result of MRBResourceAllocator is that the MRBCircuits are converted into a set of MRBMeasurements. This set of MRBMeasurements is an embodiment of the modified task object mentioned earlier. The main thread then iterates through the list of MRBMeasurements calling each one's measure function and waits until the data is returned. After all the MRBMeasurements have been performed, the resources allocated in the MRBMeasurements are returned to the MRBResourceAllocator. Then the main thread sends all the data collected back to the client. This process is repeated for the next client.

The netlist sent to the server 22 includes interconnect information necessary to assemble the DUT. As discussed above, the syntax used by SPICE indicates which device terminals are connected to which node in the circuit. Under the illustrated embodiment, circuit nodes are mapped into rows in the matrix switch 24.

Figure 8:
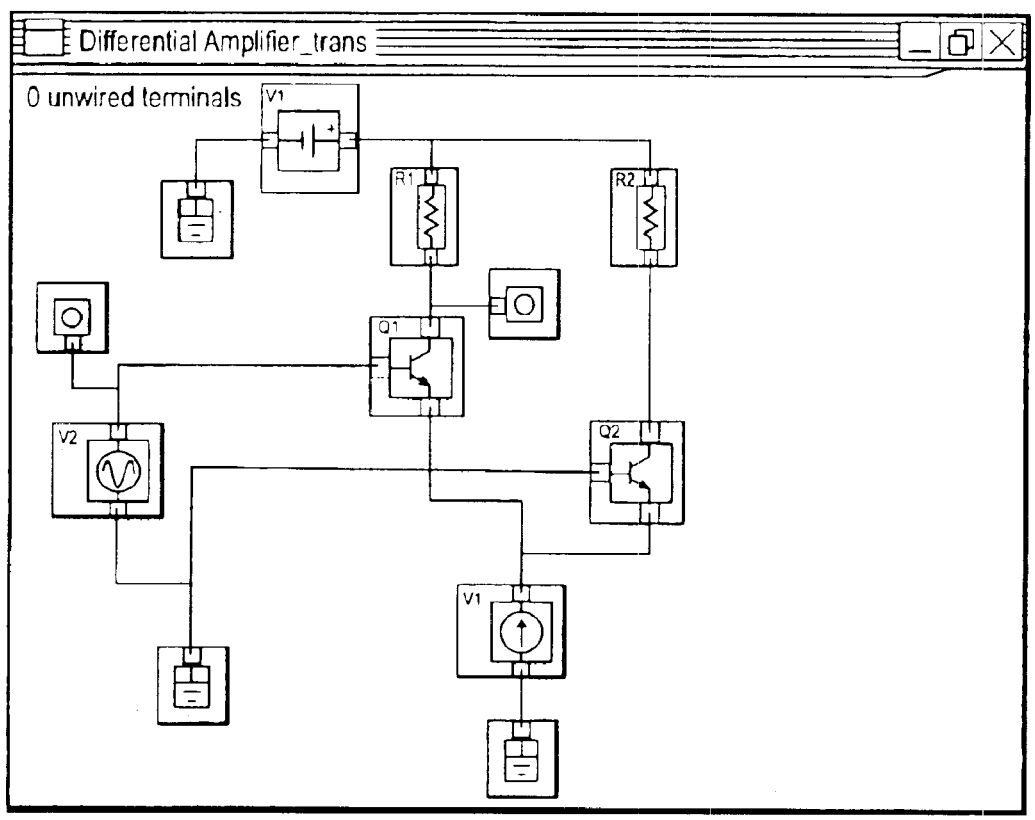
FIG. 8 depicts a circuit that may be modeled by the system of FIG. 1.

For example, the following element list entries may be used to describe the physical system of the DUT shown in FIG. 8.

| Q1 | 5 | 4 | 1 | _CA3086Q1 |
|---|---|---|---|---|
| Q2 | 2 | 0 | 1 | _CA3086Q2 |
| I1 | 1 | 0 | DC | −0.1 MA |
| R1 | 5 | 3 | | _10K OHM |
| R2 | 2 | 3 | | _10K OHM |
| V1 | 3 | 0 | DC | 10.0 V |
| V2 | 4 | 0 | | SIN (0.0 V 0.02 V 1000.0 Hz 0.0 US 0.0 0.0 DEG) |
| .TRAN 1 US 10000.0 US | | | | |
| .PRINT TRAN V(5) (−10.0 V, 10.0 V) V(4) (−1.0, 1.0 V), | | | | | where Q1, Q2, R1 and R2 are structural elements of the DUT and I1, V1 and V2 are forcing functions of the DUT. This could result in the following resource assignments.

| OSCOPE0->OSCOPE1 | I1->CHAN2 | Q2->id8 |
|---|---|---|
| 5, 29 | 1, 18 | 2, 36 |
| 0, 31 | 0, 16 | 0, 35 |
| OSCOPE1->OSCOPE2 | V2->SRS | 1, 34 |
| 4, 30 | 4, 28 | R1->id11 |
| 0, 31 | 0, 31 | 5, 41 |
| V1->CHAN1 | Q1->id7 | 3, 42 |
| 3, 17 | 5, 32 | R2->id12 |
| 0, 16 | 4, 33 | 2, 43 |
| | 1, 34 | 3, 44 |

In the resource assignment listing (shown above) each resource assignment (using the format "circuit label"->"MRBResource") is followed by two or three matrix switch closure entries having the form "row number, column number".

For example, the DC source resource (forcing function) CHAN1 is used as an element in the circuit labeled V1. CHAN1 is connected to matrix switch columns 16 (−terminal) and 17 (+terminal). To provide the structural interconnections of the circuit labeled V1 (i.e., to connect the +terminal to node 3 and the −terminal to node 0 in the circuit), two matrix switches are closed. One connects column 17 to row 3 (shown by the entry 3, 17) and the second connects column 16 to row 0 (shown by the entry 0, 16). Similarly, the MRBResourceAllocator has allocated a transistor with internal label id7 for the circuit element labeled Q1. The three leads of the id7 transistor are connected to columns 32, 33 and 34. These three terminals are connected to nodes 5, 4 and 1 in the circuit by closing relays, which connect columns 32, 33 and 34 to rows 5, 4 and 1, respectively.

The matrix switch 24 is a two-wire switch. The external connections to the switch 24 are shielded coaxial connections. The shield is connected to one of the wires and the center conductor to the second. The two conductors become joined at the device terminal. At the instrument terminals, the two wires are handled differently depending on whether the instrument is making a DC or a transient measurement. For transient measurements, the shield is left floating, whereas for DC instrument measuring points, the two wires are connected to the force and sense terminals on the instrument. This enables a high accuracy "four-wire" Kelvin measurement to be made which corrects for resistance losses in the leads. A more detailed description of the individual classes and methods used in the server program is provided in the attached Appendix I.

The modeling system 10 is a public facility on the Internet and vulnerable to attacks and malicious use. Two major precautions have been put in place to safeguard the modeling system 10. The first precaution is that the user is never aware of which TCP port the system 10 is monitoring for measurement requests. This is done to prevent anyone from directly accessing the measurement server 22 without using an official client (downloaded from the server 22).

The second precaution lies in the MRBResourceAllocator of the server 22. Here the task is checked to make sure that: all parameters in the measurement task do not exceed the tolerances specified for the instruments and DUT in the SQL database or internal program database. With this validation by the MRBResourceAllocator, no unsafe measurements are allowed to be performed. This process functions to protect the measurement equipment and DUTs from misuse.

Since the modeling system 10 is available to anyone using a web browser on the Internet, the client interface must be intuitive and easy to use. The ease of use is achieved by providing convenient graphical methods for configuring different types of measurement. The client architecture allows additional graphical tools to be plugged in to the client. Thus a specific user interface can be designed for a given measurement type, and used with a generic or specifically designed data presentation module. This feature also allows the modeling system 10 to be extended to perform highly specialized measurements.

For example, the modeling system 10 may be extended to a manufacturing operation where the DUT is a model, which has a predetermined form representing the manufacturing operation. The model may be downloaded to the terminal 12. A user may alter the model and observe the effects in real time.

A specific embodiment of a method and apparatus for a method modeling physical systems according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

APPENDIX I

TABLE OF CONTENTS (CR18)

TABLE OF CONTENTS .................................................................................................................. 1

LOGICAL VIEW REPORT ............................................................................................................. 2

PACKAGE STRUCTURE .............................................................................................................. 19

CONFIDENTIAL

LOGICAL VIEW REPORT

Logical View

This package contains the classes for communicating with instruments through the VISA standard.

INSTRInterface

This class is the concrete base class for any class wishing to support the INSTR interface in the VISA standard. Note, this class assumes access to the Rogue Wave Tools.h++ library and the National Instruments VISA library.

*Derived from VISAInterface*

Public Methods:

INSTRInterface(VISAResourceManager& manager, ViRsrc address, const RWCString& InterfaceName, ViAccessMode accessMode, ViUInt32 timeOut);
    Constructs a new INSTRInterface at the given address, with the interface name, access mode, and time out value.

INSTRInterface();
    Constructs a new uninitialized INSTRInterface

INSTRInterface(const VISAInterface& vi);
    Constructs a new INSTRInterface from a previous INSTRInterface.

virtual ~INSTRInterface();
    Destroys the INSTRInterface.

const VISAInterface& operator=(const VISAInterface& vi);
    Sets self to a shallow copy of vi.

bool operator==(const INSTRInterface& i);
    True if the two interfaces are the same. The interfaces are the same if they have the same address.

bool operator!=(const INSTRInterface& i);
    True if the two interfaces are different. The interfaces are different if they do not have the same address.

RWCString address();
    Returns the address of the interface.

RWCString getInterfaceName();
    Returns the name of the type of interface.

unsigned int getInterfaceNumber();
    Returns the board number of the interface.

unsigned int getInterfaceType();
    Returns the type of interface.

unsigned int getIoProtocol();
    Returns the io protocol of interface.

LOGICAL VIEW REPORT unsigned long getQueueLength();
    Returns the length of the event queue for the interface.

unsigned long getTimeOut();
    Returns the time out value for the interface.

const RWCString& name();
    Returns the name of the interface.

bool sendEnd();
    Returns true if the interface is going to assel an END during the transfer of the last byte of the buffer.

void setIoProtocol(unsigned int protocol);
    Sets the io protocol of interface.

void setQueueLength(unsigned long length);
    Sets the length of the event queue for the interface.

bool setSendEnd(bool yesOrNo);
    SEtst the interface to assert END during the transfer of the last byte of the buffer, if yesOrNo is true.

void setTimeOut(unsigned long timeOut);
    Sets the time out value for the interface.

GPIBInterface

This class is the concrete base class for any class wishing to support the GPIB interface in the VISA standard. Also, the GPIBInterface supports the VISA io completion and wait for service events. This class operates under the assumption that there will only be one io operation taking place at any one time. Note, this class assumes access to the Rogue Wave Tools.h++ and National Instruments VISA library.

*Derived from INSTRInterface*

Public Methods:

GPIBInterface(VISAResourceManager& manager, VIRsrc address, const RWCString& interfaceName, ViAccessMode accessMode, VIUInt32 timeOut);
    Constructs a new GPIBInterface at the given address, with the interface name, access mode, and time out value.

GPIBInterface();
    Constructs a new uninitialized GPIBInterface

GPIBInterface(const VISAInterface& v1);
    Constructs a new GPIBInterface from a previous GPIBInterface.

virtual ~GPIBInterface();
    Destroys the GPIBInterface.

const GPIBInterface& operator=(const GPIBInterface& gi);
    Sets self to a shallow copy of gi.

bool operator==(const GPIBInterface& gi);
    True if the two interfaces are the same. The interfaces are the same if they have the same address.

bool operator!=(const GPIBInterface& gi);
    True if the two interfaces are different. The interfaces are different if they do not have the same address.

RWCString address();
    Returns the address of the interface.

LOGICAL VIEW REPORT

```
void enableTermCharacter(bool yesOrNo);
```
If yesOrNo is set to true the terminating character is sent after an io write operation.

```
RWCString getInterfaceName();
```
Returns the name of the type of interface.

```
unsigned int getInterfaceNumber();
```
Returns the board number of the interface.

```
unsigned int getInterfaceType();
```
Returns the type of interface.

```
unsigned int getIoProtocol();
```
Returns the io protocol of interface.

```
unsigned int getPrimaryAddress();
```
Returns primary GPIB address for the interface.

```
unsigned long getQueueLength();
```
Returns the length of the event queue for the interface.

```
bool getRepeatAddressing();
```
Returns true if the interface is set to use repeat addressing before any io operation.

```
unsigned int getSecondaryAddress();
```
Returns the secondary GPIB address for the interface.

```
char getTermCharacter();
```
Returns the io termination character.

```
unsigned long getTimeOut();
```
Returns the time out value for the interface.

```
bool getUnaddress();
```
Returns true if the interface is set to unaddress after an io operation.

```
void killRead();
```
Kills the current read operation.

```
void killWrite();
```
Kills the current write operation.

```
const RWCString& name();
```
Returns the name of the interface.

```
bool read(RWCString& buffer, ViUInt32 timeOut = VI_TMO_INFINITE);
```
Reads data from the interface and stores it in the buffer. Note, that the data read is appended to the buffer and does not overwrite what is already there. The default behavior is for the read call to block. Specifying a timeout value in milliseconds can change this behavior.

```
bool sendEnd();
```
Returns true if the interface is going to asset an END during the transfer of the last byte of the buffer.

```
void setIoProtocol(unsigned int protocol);
```
Sets the io protocol of interface.

```
void setQueueLength(unsigned long length);
```
Sets the length of the event queue for the interface.

```
void setRepeatAddressing(bool yesOrNo);
```
If yesOrNo is true, the interface is set to use repeat addressing.

```
bool setSendEnd(bool yesOrNo);
```
SEtst the interface to assert END during the transfer of the last byte of the buffer, if yesOrNo is true.

LOGICAL VIEW REPORT void setTermCharacter(char termChar);
Sets the io termination character to the termChar.

void setTimeOut(unsigned long timeOut);
Sets the time out value for the interface.

void setUnaddress(bool yesOrNo);
If yesOrNo the inteface is set to unaddress.

unsigned short int statusByte();
Returns the status byte.

bool trigger();
Asserts a GPIB software trigger.

bool waitForSRQ(short int& sb, ViUInt32 timeOut = VI_TMO_INFINITE);
Waits for an SRQ to be asserted on the bus and the status byte retrieved. The default behavior is for this call to block. Specifying a timeout value in milliseconds can change this behavior.

bool write(const RWCString& buffer, ViUInt32 timeOut = VI_TMO_INFINITE);
Writes the buffer to the interface. The default behavior is for the write call to block. Specifying a timeout value in milliseconds can change this behavior.

**bool write(char* buffer, unsigned long numberOfBytes, ViUInt32 timeOut = VI_TMO_INFINITE);**
Writes the buffer to the interface. The default behavior is for the write call to block. Specifying a timeout value in milliseconds can change this behavior.

VISAError

This class is the exception class any class that inherits from the VISAInterface. Note, this class assumes access to the Rogue Wave Tools.h++ library and the National Instruments VISA library.

Public Methods:

VISAError(const RWCString& myErrorMsg, long errorCode);
Constructs a new VISAError with a user message and VISA error code.

VISAError(long errorCode);
Constructs a new VISAError with the given VISA error code.

long errorCode();
Returns the VISA error code.

const RWCString& msg();
Returns the user message.

const RWCString& visaError();
Returns test form of the error code.

RWCString visaMsg();
Returns the VISA error message.

VISAResourceManager

This class initializes the VISA subsystem and must be created before any VISA objects are used. Only one VISAResourceManager should be created per thread. Also, the thread safety of this class is unknown. Note, this class assumes access to the Rogue Wave Tools.h++ library and National Instruments VISA library.

LOGICAL VIEW REPORT

Public Methods:

VISAResourceManager();
 Constructs a new VISAResourceManager.

~VISAResourceManager();
 Destroys the VISAResourceManager.

ViSession operator()();
 Returns the VISA session for the resource manager.

VISAInterface

This class is the concrete base class for any class wishing to support instrument communications via the VISA standard. Note, this class assumes access to the Rogue Wave Tools.h++ library and the National Instruments VISA library.

Public Methods:

VISAInterface(VISAResourceManager& manager, ViRsrc address, const RWCString& interfaceName, ViAccessMode accessMode, ViUInt32 timeOut);
 Constructs a new VISAInterface at the given address, with the interface name, access mode, and time out value.

VISAInterface();
 Constructs a new uninitialized VISAInterface

VISAInterface(const VISAInterface& vi);
 Constructs a new VISAInterface from a previous VISAInterface.

virtual ~VISAInterface();
 Destroys the VISAInterface.

const INSTRInterface& operator=(const INSTRInterface& i);
 Sets self to a shallow copy of i.

bool operator==(const VISAInterface& vi);
 True if the two interfaces are the same. The interfaces are the same if they have the same address.

bool operator!=(const VISAInterface& vi);
 True if the two interfaces are different. The interfaces are different if they do not have the same address.

RWCString address();
 Returns the address of the interface.

unsigned long getQueueLength();
 Returns the length of the event queue for the interface.

unsigned long getTimeOut();
 Returns the time out value for the interface.

const RWCString& name();
 Returns the name of the interface.

void setQueueLength(unsigned long length);
 Sets the length of the event queue for the interface.

void setTimeOut(unsigned long timeOut);
 Sets the time out value for the interface.

LOGICAL VIEW REPORT

Protected Methods:

`VISession session();`
Returns the VISA session associated with the interface.

SRSDS345

SRSDS345

This class is used for communications with the SRSDS345 function generator.

*Derived from IPulseWave*
*Derived from ISinWave*

Public Methods:

`SRSDS345(VISAResourceManager& rm, const RWCString& address);`
Creates an SRSDS345 at the given address.

`-SRSDS345();`
Destroys an SRSDS345.

`void pulseWaveClear();`
Clears the instrument making the pulse1 wave.

`void pulseWaveCommit();`
Commits the pulse wave to the device making the wave.

`void pulseWaveSetup(const RWCString& initialVoltage, const RWCString& pulseVoltage, const RWCString& delayTime, const RWCString& riseTime, const RWCString& fallTime, const RWCString& pulseTime, const RWCString& period);`
Sets up the pulse wave.

`void pulseWaveTrigger();`
Triggers the pulse wave.

`void pulseWaveWait(bool shouldWait = true);`
Sets the device making the pulse wave to wait for an external trigger.

`void sinWaveClear();`
Clears the instrument making the sine wave.

`void sinWaveCommit();`
Commits the sine wave to the device making the wave.

`void sinWaveSetup(const RWCString& offset, const RWCString& amplitude, const RWCString& frequency, const RWCString& delay, const RWCString& alpha, const RWCString& phase);`
Sets up the sine wave.

`void sinWaveTrigger();`
Triggers the sine wave.

`void sinWaveWait(bool shouldWait = true);`
Sets the device making the sine wave to wait for an external trigger.

Measurement Request Broker

MRBActuator

This class abstracts all the instrument interfaces. It allows uniform access to any interface.

LOGICAL VIEW REPORT

Public Methods:

**MRBActuator(MRBDevice* pDevice);**
Constructs an MRBActuator with the given MRBDevice.

~MRBActuator();
Destroys the MRBActuator.

void clear();
Clears the device in the actuator.

void commit();
Commits the device in the actuator.

**MRBDevice* device();**
Returns the device in the actuator.

bool increment();
Increments the actuator one step. Will return false when the actuator is incremented beyond its final value.

void reset();
Resets the actuator to its initial state.

void setup();
Sets up the device contained in the actuator.

void wait(bool wait = true);
Sets the device in the actuator to wait for external trigger.

MRBDevice

This class represents a device in circuit. It holds its location as well as all the properties associated with the device. Also, it contains the interface to access the instrument associated with the device.

Public Methods:

MRBDevice(const RWCString& name, int type, int subType);
Creates a new device with given name, type, and subtype.

MRBDevice(const MRBDevice& device);
Creates a new MRBDevice that is a copy of device.

MRBDevice();
Creates an empty MRBDevice.

~MRBDevice();
Destroys an MRBDevice.

operator==(const MRBDevice& testDevice);
Compare self to passed device.

RWCString& operator[](int property);
Returns the property at this location.

RWCString& at(int property);
Returns the property at this location.

bool getLocation(int wire, int& row, int& column);
Retrieves the matrix switch location of the given wire on the device.

**ICurrentBias* ICurrentBias();**
Returns an ICurrentBias pointer.

**ICurrentData* ICurrentData();**
Returns an ICurrentData pointer.

LOGICAL VIEW REPORT

ICurrentSweep* iCurrentSweep();
    Returns an ICurrentSweep pointer.

IOscope* iOscope();
    Returns an IOscope pointer.

IPulseWave iPulseWave();
    Returns an IPulseWave pointer.

ISinWave* iSinWave();
    Returns an ISinWave pointer.

IVoltageBias* iVoltageBias();
    Returns an IVoltageBias pointer.

IVoltageData* iVoltageData();
    Returns an IVoltageData pointer.

iVoltageSetup();
    Returns an IVoltageSetup pointer.

const RWCString& resourceName();
    Name of the resource being encapsulated by this device.

void setColumn(int wire, int column);
    Sets the column location of the given wire.

void setRow(int wire, int row);
    Sets the row location for the given wire.

int subType();
    Returns the subtype.

void takeResource(MRBDevice* pDevice);
    Takes some of the properties from the passed device and sets them in the current device.

void takeRowsFrom(MRBDevice& device);
    Takes rows from passed device and sets the rows in self.

int type();
    Returns the type.

MRBCompiler
This class compiles a SPICE net list in to a list of MRBDevices called an MRBCircuit.

Public Methods:

MRBCompiler(const RWCString& lexTableName, const RWCString& yaccTableName);
    Creates a new compiler.

~MRBCompiler();
    Destroys an MRBCompiler.

bool compile(RWCString& netList, RWTPtrDlist<MRBCircuit>& circuits, RWCString& errorString);
    Compiles the net list in to a list of MRBCircuits. All errors are placed in the error string.

MRBResource
This class encapsulates an MRBResource. An MRBResource represents a real life instrument or device, with all the interfaces it supports.

Public Methods:

~MRBResource();
    Destroys an new MRBResource.

LOGICAL VIEW REPORT

MRBResource();
Creates an new MRBResource.

**void addDevice(MRBDevice* pDevice);**
Adds a device to the resource

**MRBDevice* getDevice(int type, int subtype);**
Returns the device corresponding to the type and subtype.

bool supports(int type, int subtype);
Returns true if the resource supports the type and subtype of an interface.

MRBMeasurement

This class encapsulates a measurement as performed by the Measurement Request Broker.

Public Methods:

MRBMeasurement(RWTPtrDllst<MRBActuator>& deviceList, RWTPtrDllst<MRBActuator>& dataList, RWTPtrDllst<MRBResource> resourceList, RWTPtrDllst<MRBDevice>& nonActuatorList);
Creates a new MRBMeasurement.

~MRBMeasurement();
Destroys an MRBMeasurement.

**void connect(IBigMatrix* pMatrixSwitch, RWCString& info);**
Connects all the devices in the MRBMeasurement.

RWCString measure();
Does the measurement stored in the MRBMeasurement.

MRBCircuit

This class represents a circuit. It is a collection of MRBDevices.

MRBResourceAllocator

This class converts a MRBCircuit in to an MRBMeasurement.

Public Methods:

MRBResourceAllocator(const RWCString& nonSources, const RWCString& sources);
Creates an new MRBResourceAllocator.

~MRBResourceAllocator();
This destroys an MRBResourceAllocator.

**bool allocate(MRBCircuit* circuit, MRBMeasurement*& pMeasurement, RWCString& errorString);**
This allocates resource turning an MRBCircuit in to an MRBMeasurement.

**deallocate(MRBMeasurement*& pMeasurement);**
This deallocates the resources used in the MRBMeasurement.

InstrumentInterfaces

This package is set of instrument interfaces. Any instrument wishing to support a particular kind of functionality will inheirit from the interfaces in this package.

ICurrentSweep

This is the base interface for any instrument wishing to support current sweeps.

LOGICAL VIEW REPORT

Public Methods:

virtual void currentSweepClear() = 0;
Clears the instrument performing the current sweep.

virtual void currentSweepCommit() = 0;
Commits the current sweep to the device performing the sweep.

virtual void currentSweepSetup(const RWCString& start, const RWCString& stop, const RWCString& increment, const RWCString& type, const RWCString& compliance) = 0;
Sets up the current sweep.

virtual void currentSweepTrigger() = 0;
Triggers the current sweep.

virtual void currentSweepWait(bool shouldWait = true) = 0;
Sets the device performing the current sweep to wait for an external trigger.

IVoltageSweep

This is the base interface for any instrument wishing to support voltage sweeps.

Public Methods:

virtual void voltageSweepClear() = 0;
Clears the instrument performing the voltage sweep.

virtual void voltageSweepCommit() = 0;
Commits the voltage sweep to the device performing the sweep.

virtual void voltageSweepSetup(const RWCString& start, const RWCString& stop, const RWCString& increment, const RWCString& type, const RWCString& compliance) = 0;
Sets up the voltage sweep.

virtual void voltageSweepTrigger() = 0;
Triggers the voltage sweep.

virtual void voltageSweepWait(bool shouldWait = true) = 0;
Sets the device performing the voltage sweep to wait for an external trigger.

ICurrentBias

This is the base interface for any instrument wishing to support current bias.

Public Methods:

virtual void currentBiasClear() = 0;
Clears the instrument performing the current bias.

virtual void currentBiasCommit() = 0;
Commits the current bias to the device performing the sweep.

virtual void currentBiasSetup(const RWCString& value, const RWCString& compliance) = 0;
Sets up the current bias.

virtual void currentBiasTrigger() = 0;
Triggers the current bias.

virtual void currentBiasWait(bool shouldWait = true) = 0;
Sets the device performing the current bias to wait for an external trigger.

IVoltageBias

This is the base interface for any instrument wishing to support voltage bias.

LOGICAL VIEW REPORT

Public Methods:

`virtual void voltageBiasClear() = 0;`
Clears the instrument performing the voltage bias.

`virtual void voltageBiasCommit() = 0;`
Commits the voltage bias to the device performing the sweep.

`virtual void voltageBiasSetup(const RWCString& value, const RWCString& compliance) = 0;`
Sets up the voltage bias.

`virtual void voltageBiasTrigger() = 0;`
Triggers the voltage bias.

`virtual void voltageBiasWait(bool shouldWait = true) = 0;`
Sets the device performing the voltage bias to wait for an external trigger.

IVoltageData

This is the base interface for any instrument wishing to support voltmeters.

Public Methods:

`virtual RWCString voltageData() = 0;`
Returns the measured data.

`virtual void voltageDataClear() = 0;`
Clears the instrument performing the voltage measurement.

`virtual void voltageDataCommit() = 0;`
Commits the setup to the device performing the measurement.

`virtual void voltageDataSetup(int node) = 0;`
Sets up the voltage measurement.

ICurrentData

This is the base interface for any instrument wishing to support ammeters.

Public Methods:

`virtual RWCString currentData() = 0;`
Returns the measured data.

`virtual void currentDataClear() = 0;`
Clears the instrument performing the current measurement.

`virtual void currentDataCommit() = 0;`
Commits the setup to the device performing the measurement.

`virtual void currentDataSetup(int node) = 0;`
Sets up the voltage current.

ISinWave

This is the base interface for any instrument wishing to support sine waves.

Public Methods:

`virtual void sinWaveClear() = 0;`
Clears the instrument making the sine wave.

`virtual void sinWaveCommit() = 0;`
Commits the sine wave to the device making the wave.

LOGICAL VIEW REPORT

```
virtual void sinWaveSetup(const RWCString& offset, const RWCString& amplitude, const RWCString&
    frequency, const RWCString& delay, const RWCString& alpha, const RWCString& phase) = 0;
```
Sets up the sine wave.

```
virtual void sinWaveTrigger() = 0;
```
Triggers the sine wave.

```
virtual void sinWaveWait(bool shouldWait = true) = 0;
```
Sets the device making the sine wave to wait for an external trigger.

IExpWave

This is the base interface for any instrument wishing to support exponetial waves.

Public Methods:

```
virtual void expWaveClear() = 0;
```
Clears the instrument making the exponential wave.

```
virtual void expWaveCommit() = 0;
```
Commits the exponetial wave to the device making the wave.

```
virtual void expWaveSetup(const RWCString& initialVoltage, const RWCString& pulseVoltage, const
    RWCString& riseDelayTime, const RWCString& riseTimeConst, const RWCString& fallDelayTime,
    const RWCString& fallTimeConst) = 0;
```
Sets up the exponential wave.

```
virtual void expWaveTrigger() = 0;
```
Triggers the exponential wave.

```
virtual void expWaveWait(bool shouldWait = true) = 0;
```
Sets the device making the exponential wave to wait for an external trigger.

IPulseWave

This is the base interface for any instrument wishing to support pulse waves.

Public Methods:

```
virtual void pulseWaveClear() = 0;
```
Clears the instrument making the pulsel wave.

```
virtual void pulseWaveCommit() = 0;
```
Commits the pulse wave to the device making the wave.

```
virtual void pulseWaveSetup(const RWCString& initialVoltage, const RWCString& pulseVoltage, const
    RWCString& delayTime, const RWCString& riseTime, const RWCString& fallTime, const
    RWCString& pulseTime, const RWCString& period) = 0;
```
Sets up the pulse wave.

```
virtual void pulseWaveTrigger() = 0;
```
Triggers the pulse wave.

```
virtual void pulseWaveWait(bool shouldWait = true) = 0;
```
Sets the device making the pulse wave to wait for an external trigger.

IOscope

This is the base interface for any instrument wishing to support oscilliscopes.

Public Methods:

```
virtual RWCString oscopeData() = 0;
```
Returns the measured data.

LOGICAL VIEW REPORT

```
virtual void oscopeDataClear() = 0;
```
Clears the instrument performing the oscilliscope measurement.

```
virtual void oscopeDataCommit() = 0;
```
Commits the setup to the device performing the measurement.

```
virtual void oscopeDataSetup(int node, const RWCString& timeBase, const RWCString& verticalRange) = 0;
```
Sets up the voltage measurement.

ISmallMatrix

This class is the base interface for any instrument to be a matrix switch.

Public Methods:

```
virtual void close(unsigned int row, unsigned int column) = 0;
```
Closes a connection in the switch.

```
unsigned int columns();
```
Returns the number of columns in the switch.

```
virtual void free(unsigned int row) = 0;
```
Frees the given row in the switch.

```
virtual void freeAll() = 0;
```
Frees all connections in the switch.

```
virtual void open(unsigned int row, unsigned int column) = 0;
```
Opens a connection in the switch.

```
virtual unsigned int rows() = 0;
```
Returns the number of rows in the switch.

IBigMatrix

This class is the base interface for the full matrix switch.

Public Methods:

```
void add(ISmallMatrix*& pSmallSwitch);
```
Adds a small matrix switch to the large matrix switch.

```
virtual void close(unsigned int row, unsigned int column) = 0;
```
Closes a connection in the switch.

```
virtual unsigned int columns() = 0;
```
Returns the number of columns in the switch.

```
virtual void free(unsigned int row) = 0;
```
Frees the given row in the switch.

```
virtual void freeAll() = 0;
```
Frees all connections in the switch.

```
virtual void open(unsigned int row, unsigned int column) = 0;
```
Opens a connection in the switch.

```
virtual unsigned int rows() = 0;
```
Returns the number of rows in the switch.

LOGICAL VIEW REPORT

HP4142B

This class is used for communications with the HP4124B.

Public Methods:

HP4142B(VISAResourceManager& rm, const RWCString& address);
  Creates an HP4124B at the given address.

~HP4142B(VISAResourceManager& rm, const RWCString& address);
  Destroys an HP4124B.

void clear();
  Clears the HP4142B.

void commit();
  Writes all commands out to the instrument.

RWCString getData(int channel);
  Returns data for the given channel from the HP4142B.

void giveCommand(int channel, const RWCString& command);
  Gives the command string for the given channel to the HP4142B.

void wait(bool shouldWait);
  If shouldWait is true, then the HP4142B is set to trigger from an external source.

HP41421B

This class represents the HP41421B Source Measurement Unit cartridge for the HP4142B. It proxies the HP4142B.

*Derived from ICurrentBias*
*Derived from ICurrentData*
*Derived from ICurrentSweep*
*Derived from IVoltageBias*
*Derived from IVoltageData*
*Derived from IVoltageSweep*

Public Methods:

HP41421B(HP4142B& server, int channel);
  This constructs an HP41421B for the given channel for the given HP4142B.

~HP41421B();
  Destroys the HP41421B.

void currentBiasClear();
  Clears the instrument performing the current bias.

void currentBiasCommit();
  Commits the current bias to the device performing the sweep.

void currentBiasSetup(const RWCString& value, const RWCString& compliance);
  Sets up the current bias.

void currentBiasTrigger();
  Triggers the current bias.

void currentBiasWait(bool shouldWait = true);
  Sets the device performing the current bias to wait for an external trigger.

RWCString currentData();
  Returns the measured data.

LOGICAL VIEW REPORT void currentDataClear();
   Clears the instrument performing the current measurement.

void currentDataCommit();
   Commits the setup to the device performing the measurement.

void currentDataSetup(int node);
   Sets up the voltage current.

void currentSweepClear();
   Clears the instrument performing the current sweep.

void currentSweepCommit();
   Commits the current sweep to the device performing the sweep.

void currentSweepSetup(const RWCString& start, const RWCString& stop, const RWCString& increment, const RWCString& type, const RWCString& compliance);
   Sets up the current sweep.

void currentSweepTrigger();
   Triggers the current sweep.

void currentSweepWait(bool shouldWait = true);
   Sets the device performing the current sweep to wait for an external trigger.

void voltageBiasClear();
   Clears the instrument performing the voltage bias.

void voltageBiasCommit();
   Commits the voltage bias to the device performing the sweep.

void voltageBiasSetup(const RWCString& value, const RWCString& compliance);
   Sets up the voltage bias.

void voltageBiasTrigger();
   Triggers the voltage bias.

void voltageBiasWait(bool shouldWait = true);
   Sets the device performing the voltage bias to wait for an external trigger.

RWCString voltageData();
   Returns the measured data.

void voltageDataClear();
   Clears the instrument performing the voltage measurement.

virtual void voltageDataCommit() = 0;
   Commits the setup to the device performing the measurement.

void voltageDataSetup(int node);
   Sets up the voltage measurement.

void voltageSweepClear();
   Clears the instrument performing the voltage sweep.

void voltageSweepCommit();
   Commits the voltage sweep to the device performing the sweep.

virtual void voltageSweepSetup(const RWCString& start, const RWCString& stop, const RWCString& increment, const RWCString& type, const RWCString& compliance) = 0;
   Sets up the voltage sweep.

void voltageSweepTrigger();
   Triggers the voltage sweep.

void voltageSweepWait(bool shouldWait = true);
   Sets the device performing the voltage sweep to wait for an external trigger.

LOGICAL VIEW REPORT

HP41424A

This class represents the HP41424A Voltage Source/ Voltage Measurement cartridge for the HP4142B. It proxies the HP4142B.

*Derived from IVoltageBias*
*Derived from IVoltageData*
*Derived from IVoltageSweep*

Public Methods:

HP41424A(HP4142B& server, int channel);
Constructs an HP41424A for the given channel for the given HP4142B.

~HP41424A();
Destroys an HP41424A.

void voltageBiasClear();
Clears the instrument performing the voltage bias.

void voltageBiasCommit();
Commits the voltage bias to the device performing the sweep.

void voltageBiasSetup(const RWCString& value, const RWCString& compliance);
Sets up the voltage bias.

void voltageBiasTrigger();
Triggers the voltage bias.

void voltageBiasWait(bool shouldWait = true);
Sets the device performing the voltage bias to wait for an external trigger.

RWCString voltageData();
Returns the measured data.

void voltageDataClear();
Clears the instrument performing the voltage measurement.

virtual void voltageDataCommit() = 0;
Commits the setup to the device performing the measurement.

void voltageDataSetup(int node);
Sets up the voltage measurement.

void voltageSweepClear();
Clears the instrument performing the voltage sweep.

void voltageSweepCommit();
Commits the voltage sweep to the device performing the sweep.

virtual void voltageSweepSetup(const RWCString& start, const RWCString& stop, const RWCString& increment, const RWCString& type, const RWCString& compliance) = 0;
Sets up the voltage sweep.

void voltageSweepTrigger();
Triggers the voltage sweep.

void voltageSweepWait(bool shouldWait = true);
Sets the device performing the voltage sweep to wait for an external trigger.

HP41425A

LOGICAL VIEW REPORT

HPE1467A

This class is the instrument driver for the HPE1467A VXI matrix switch.

*Derived from ISmallMatrix*

Public Methods:

HPE1467A(const RWCString& address);
  Creates an HPE1467A at the given address.

~HPE1467A();
  Destroys an HPE1467A.

void close(unsigned int row, unsigned int column);
  Closes a connection in the switch.

unsigned int columns();
  Returns the number of columns in the switch.

void free(unsigned int row);
  Frees the given row in the switch.

void freeAll();
  Frees all connections in the switch.

void open(unsigned int row, unsigned int column);
  Opens a connection in the switch.

unsigned int rows();
  Returns the number of rows in the switch.

HP54600B

HP54600B

This class is used for communications with the HP54600B.

Public Methods:

HP54600B(VISAResourceManager& rm, const RWCString& address);
  This creates an HP54600B at the given address.

~HP54600B();
  Destroys an HP54600B.

void clear();
  Clears the HP4142B.

void commit();
  Writes all commands out to the instrument.

RWCString getData(int channel);
  Returns data for the given channel from the HP54600B.

void sendCommand(int channel, const RWCString& command);
  Gives the command string for the given channel to the HP54600B.

HP54600BChannel

This class represents a channel of the HP54600B. It proxies the HP54600B.

LOGICAL VIEW REPORT

*Derived from IOscope*

Public Methods:

HP54600BChannel(int channel, HP54600B& server);
Creates a HP54600BChannel for the given channel on the given HP54600B. This class proxies the HP54600B.

~HP54600BChannel();
Destroys the HP54600BChannel.

RWCString oscopeData();
Returns the measured data.

void oscopeDataClear();
Clears the instrument performing the oscilloscope measurement.

void oscopeDataCommit();
Commits the setup to the device performing the measurement.

void oscopeDataSetup(int node, const RWCString& timeBase, const RWCString& verticalRange);
Sets up the voltage measurement.

Instrument Drivers

PACKAGE STRUCTURE

Logical View

VISA
Instrument Interfaces
Instrument Drivers

HP4142B

HP54600B

SRSDS345

HPE1467A

Measurement Request Broker

APPENDIX II

```
void main()
{
    VISAResourceManager rm;

//create the matrix switch
    ViSession s = rm();
    ISmallMatrix *pLower = NULL;
    ISmallMatrix *pUpper = NULL;
    IBigMatrix *pBig = NULL;

CoInitializeEx(0, COINIT_MULTITHREADED);
    if (viOpenDefaultRM(&s) == VI_SUCCESS) cout <<"got the session\n";

HRESULT hr = ::CoCreateInstance(CLSID_HPE1467A, NULL,
CLSCTX_INPROC_SERVER, IID_ISmallMatrix, (void**)&pLower);
    if (SUCCEEDED(hr))
    {
        cout << "got the lower interface\n";

cout << "trying to create instance of the instrument\n";
        hr = pLower->Create(&s, "VXI0::120::INSTR", NULL,NULL);
        if (SUCCEEDED(hr)) cout << "VXI0::120::INSTR\n";
    }
    hr = ::CoCreateInstance(CLSID_HPE1467A, NULL, CLSCTX_INPROC_SERVER,
IID_ISmallMatrix, (void**)&pUpper);
    if (SUCCEEDED(hr))
    {
        cout << "got the upper interface\n";

cout << "trying to create instance of the instrument\n";
        hr = pUpper->Create(&s, "VXI0::121::INSTR", NULL,NULL);
        if (SUCCEEDED(hr)) cout << "VXI0::121::INSTR\n";
    }
    hr = ::CoCreateInstance(CLSID_BigMatrix, NULL, CLSCTX_INPROC_SERVER,
IID_IBigMatrix, (void**)&pBig);
    if (SUCCEEDED(hr))
    {
        UINT x,y;

cout << "got the big interface\n";

cout << "trying to insert switches\n";
        pBig->Add(&pLower);
        pBig->Add(&pUpper);
        pBig->GetColumns(&x);
        pBig->GetLines(&y);

cout << x << " " << y << endl;
    }

RWCString lexTable("c:\\stephan\\marble\\server\\spice.dfa");
    RWCString yaccTable("c:\\stephan\\marble\\server\\spice.llr");
    MRBCompiler compiler(lexTable.data(), yaccTable.data());
    MRBResourceAllocator
resourceAllocator("c:\\stephan\\marble\\server\\debug\\nonsources.txt",
"c:\\stephan\\marble\\server\\debug\\sources.txt");
```

```cpp
//create the sock
RWWinSockInfo sockInfo;

//create the sock listener
RWSocketListener serverSocket(RWSockAddr("inet lochaber.eecs.uic.edu 6969"));

//output file
RWCString outDirectory = "c:\\stephan\\niif\\serverlog\\";
RWCString outFileName  = "c:\\stephan\\niif\\serverlog\\";
RWDate date;
RWCString dt = date.asString().remove(2,1);
dt = dt.remove(4,1);
RWCString currentFile = dt + ".txt";
outFileName = outFileName + currentFile;
ofstream logFile(outFileName, ios::app);

for (;;)
{
    try
    {
        RWSocketPortal sockPortal = serverSocket();
        RWTime startTime;
        RWTimer timer;
        timer.start();
        RWPortalIStream netIn(sockPortal);
        RWPortalOStream netOut(sockPortal);
        RWInetAddr inetAddr = sockPortal.socket().getpeername();
        cout << sockPortal.socket().getpeername() << endl;

strstream temp;
        temp << sockPortal.socket().getpeername() << endl;
        RWCString tempClient;
        tempClient.readLine(temp);
        RWCRegexp address("[0-9]+\\.[0-9]+\\.[0-9]+\\.[0-9]+");
        RWCString clientAddress = tempClient(address);

//get the port
        int clientReturnPort = 0;
        netIn >> clientReturnPort;

RWCString userInfo;
        userInfo.readLine(netIn);
        cout << userInfo << endl;

RWCString circuitString;
        circuitString.readLine(netIn);
        cout << circuitString << endl;

//get the netlist
        RWCString netList;
        netList.readFile(netIn);

//output the client data
        //cout << RWInetHost::addressAsString(inetAddr.host().address()) << endl;
        cout << "Client IP: " << clientAddress << endl;
```

```
        //cout << "Client Port: " << inetAddr.port() << endl;
        cout << "Client Data Port: " << clientReturnPort << endl;
        cout << "Net List" << endl;
        cout << netList << endl;

//create error string and circuit list
        RWTPtrDlist<RWTPtrDlist<MRBDevice> > circuitList;
        RWCString error = "\0";
        RWCString data = "\0";
        RWCString connectionInfo = "\0";

if (!compiler.compile(netList, circuitList, error))
        {
            cout << error << endl;
        }
        else
        {
            MRBMeasurement* pMeasurement;
            if (!resourceAllocator.allocate(circuitList.get(),
pMeasurement,error))
            {
                resourceAllocator.deallocate(pMeasurement);
                cout << error << endl;
            }
            else
            {
                try
                {
                    pMeasurement->connect(pBig, connectionInfo);
                    data = pMeasurement->measure();
                    cout << data << endl;
                    resourceAllocator.deallocate(pMeasurement);
                }
                catch (VISAError e)
                {
                    resourceAllocator.deallocate(pMeasurement);
                    cout << e.visaMsg();
                    error += e.visaMsg() + "$";
                }
            }
            circuitList.clear();
        }
        //try sending the data back
        try
        {
            RWPortal clientPortal =
RWSocketPortal(RWInetAddr(clientReturnPort, clientAddress));
            RWPortalOStream clientOut(clientPortal);

if (error.isNull())
            {
                clientOut << data << endl;
            }
            else
            {
                clientOut << error << endl;
            }
```

```
        }
        catch( const RWxmsg& msg)
        {
            cerr << "Error: " << msg.why() << endl;
            error += msg.why();
        }
        RWTime stopTime;
        timer.stop();

//get the current file
        RWDate tempDate;
        date = tempDate;
        dt = date.asString().remove(2,1);
        dt = dt.remove(4,1);
        RWCString tempFile = dt + ".txt";

if (tempFile != currentFile)
        {
            logFile.close();
            outFileName = outDirectory + tempFile;
            logFile.open(outFileName, ios::app);
            currentFile = tempFile;
        }
        //write data to log file
        logFile << "Date: " << RWDate() << endl;
        logFile << "Start time: " << startTime << endl;
        logFile << "Stop time: " << stopTime << endl;
        logFile << "Total elapsed time: " << timer.elapsedTime() << endl;
        logFile << "Client IP: " << clientAddress << endl;
        //logFile << "Client Port: " << inetAddr.port() << endl;
        logFile << "Client Data Port: " << clientReturnPort << endl;
        logFile << "User info:" << endl;
        logFile << userInfo <<endl;
        logFile << "Circuit:" << endl;
        logFile << circuitString << endl;
        logFile << "Net List" << endl;
        logFile << netList;
        logFile << "NetListLength: " << netList.length() << endl;
        logFile << "Connection Info" << endl;
        logFile << connectionInfo << endl;
        logFile << "Data" << endl << data <<endl;
        logFile << "Error" << endl << error << endl << endl;
    }
    catch (const RWxmsg& msg)
    {
        cerr << "Error: " << msg.why() << endl;
        logFile << msg.why() << endl;
    }
}
CoUninitialize();
}
```

What is claimed is:

1. A method of assembling and operating a physical system from a remote location, such physical system having a plurality of structural elements and structural interconnections, such method comprising the steps of:
   providing a means for electrically interconnecting the plurality of structural elements;
   providing an element controller for configuring the elements and controlling the means for electrically interconnecting;
   creating an element list delineating the elements, the interconnections and configurable properties of the physical system to be assembled and operated from the remote location;
   transferring the element list from the remote location to the element controller of the interconnection means; and
   assembling and operating the system by the element controller in accordance with the element list by interconnecting and configuring the elements.

2. The method of assembling and operating a physical structure of a system as in claim 1 further comprising creating a graphical representation of the physical system at the remote location showing the elements and connections of the system to be assembled and providing a graphical user interface with an assembly area for display of the graphical representation and a reference area for display of icons of structural elements, forcing functions and measurement instruments.

3. The method of assembling and operating a physical structure of a system as in claim 2 further comprising dragging icons of elements from the reference area to the graphical representation in the assembly area.

4. The method of assembling and operating a physical structure of a system as in claim 3 further comprising connecting the icons of the elements in the assembly area.

5. The method of assembling and operating a physical structure of a system as in claim 2 further comprising spawning a job object within the element controller in response to receipt of the element list.

6. The method of assembling and operating a physical structure of a system as in claim 5 further comprising decomposing the job object into a set of job elements.

7. The method of assembling and operating a physical structure of a system as in claim 6 wherein the step of decomposing the job object into a set of job elements further comprises validating the parameters against a set of instrument and element limitations.

8. The method of assembling and operating a physical structure of a system as in claim 7 wherein the step of assembling the system further comprising closing a set of contacts within a matrix switch.

9. The method of assembling and operating a physical structure of a system as in claim 8 wherein the step of operating the system further comprising connecting a forcing function to the assembled elements.

10. The method of assembling and operating a physical structure of a system as in claim 9 further comprising recording a system response to the forcing function.

11. The method of assembling and operating a physical structure of a system as in claim 10 further comprising transferring a graphical representation of the system response to the remote location.

12. The method of assembling and operating a physical structure of a system as in claim 1 further comprising defining the element list as a netlist.

13. Apparatus for assembling and operating a physical system from a remote location, such system having a plurality of structural elements and structural interconnections, the apparatus comprising:
   means for electrically interconnecting the elements;
   an element controller for configuring the elements and controlling the means for electrically interconnecting;
   means for creating an element list delineating the elements, the interconnections and configurable properties of the physical system to be assembled and operated from the remote location;
   means for transferring the element list from the remote location to the element controller of the interconnection means; and
   means for assembling and operating the system by the element controller in accordance with the element list by interconnecting and configuring the elements.

14. The apparatus for assembling and operating a physical structure of a system as in claim 13 wherein the means for creating the element list further comprises a means for creating a graphical representation of the physical system at the remote location showing the elements and connections of the system to be assembled and means for providing a graphical user interface with an assembly area for display of the graphical representation and a reference area for display of icons of structural elements, forcing functions and measurement instruments.

15. The apparatus for assembling and operating a physical structure of a system as in claim 14 further comprising means for dragging icons of system elements to the graphical representation in the assembly area.

16. The apparatus for assembling and operating a physical structure of a system as in claim 15 further comprising means for connecting the icons of the elements in the assembly area.

17. The apparatus for assembling and operating a physical structure of a system as in claim 13 further comprising means for spawning a job object within the element controller in response to receipt of the element list.

18. The apparatus for assembling and operating a physical structure of a system as in claim 17 further comprising means for decomposing the job object into a set of job elements.

19. The apparatus for assembling and operating a physical structure of a system as in claim 18 wherein the means for decomposing the job object into a set of job elements further comprises means for validating the measurement elements against a set of instrument and structural element limitations.

20. The apparatus for assembling and operating a physical structure of a system as in claim 19 wherein the means for assembling the system further comprises means for closing a set of contacts within a matrix switch.

21. The apparatus for assembling and operating a physical structure of a system as in claim 20 wherein the means for operating the system further comprises means for connecting a forcing function to the assembled elements.

22. The apparatus for assembling and operating a physical structure of a system as in claim 21 further comprising means for recording a system response to the forcing function.

23. The apparatus for assembling and operating a physical structure of a system as in claim 22 further comprising means for transferring a graphical representation of the system response to the remote location.

24. Apparatus for assembling and operating a physical system from a remote location, such system having a plurality of structural elements and structural interconnections, the apparatus method comprising:

means for switching for electrically interconnecting the elements;

an element controller for configuring the elements and controlling the plurality of switches;

a conversion processor adapted to create an element list delineating the elements and the interconnections and configurable properties of the physical system to be assembled and operated from the remote location;

a communication processor adapted to transfer the element list from the remote location to an element controller of the plurality of switches; and wherein the element controller is adapted to assemble and operate the system in accordance with the element list by interconnecting and configuring the elements.

25. The apparatus for assembling and operating a physical structure of a system as in claim 24 wherein the remote location further comprises a remote terminal adapted to create a graphical representation of the physical system at the remote location showing the elements and connections of the system to be assembled and a graphical user interface adapted to provide an assembly area for display of the graphical representation and a reference area for display of icons of structural elements, forcing functions and measurement instruments.

26. The apparatus for assembling and operating a physical structure of a system as in claim 24 further comprising a job object adapted to decompose the element list into a set of job elements.

27. The apparatus for assembling and operating a physical structure of a system as in claim 26 further comprising a validation object adapted to validate the job elements.

28. The apparatus for assembling and operating a physical structure of a system as in claim 27 further comprising a an object queue adapted for scheduling and operating the physical system described by the job elements.

29. The apparatus for assembling and operating a physical structure of a system as in claim 28 further comprising a forcing function adapted to load the physical system.

30. The apparatus for assembling and operating a physical structure of a system as in claim 29 further comprising a measurement instrument adapted to record a system response to the forcing function.

31. The apparatus for assembling and operating a physical structure of a system as in claim 28 further comprising a matrix switch adapted to interconnect the structural elements, the forcing function and the measurement instrument of the physical system.

32. The apparatus for assembling and operating a physical structure of a system as in claim 31 further comprising a job object adapted to transfer a graphical representation of the system response to the remote location.

* * * * *